(12) United States Patent
Roach et al.

(10) Patent No.: US 11,509,678 B2
(45) Date of Patent: Nov. 22, 2022

(54) AUTOMATED SECURITY ASSESSMENT SYSTEMS

(71) Applicant: CERNER INNOVATION, INC., Kansas City, KS (US)

(72) Inventors: Carl D. Roach, Overland Park, KS (US); Clayton R. Joseck, Kansas City, MO (US)

(73) Assignee: CERNER INNOVATION, INC., North Kansas City, MO (US)

( * ) Notice: Subject to any disclaimer, the term of this patent is extended or adjusted under 35 U.S.C. 154(b) by 269 days.

(21) Appl. No.: 16/917,234

(22) Filed: Jun. 30, 2020

(65) Prior Publication Data

US 2021/0409437 A1    Dec. 30, 2021

(51) Int. Cl.
*G06F 15/173* (2006.01)
*H04L 9/40* (2022.01)
*G06Q 30/00* (2012.01)

(52) U.S. Cl.
CPC ....... *H04L 63/1433* (2013.01); *G06Q 30/018* (2013.01); *H04L 63/20* (2013.01)

(58) Field of Classification Search
CPC .... G06Q 30/018; H04L 63/1433; H04L 63/02
USPC ...................... 709/223, 224; 726/1
See application file for complete search history.

(56) References Cited

U.S. PATENT DOCUMENTS

| | | | | |
|---|---|---|---|---|
| 8,764,454 B1* | 7/2014 | Turner | ............... | G09B 19/00 434/323 |
| 10,360,408 B1* | 7/2019 | Kincaid | ............... | G06F 21/57 |
| 2015/0244734 A1* | 8/2015 | Olson | ............... | G06F 21/577 726/25 |
| 2018/0091558 A1* | 3/2018 | Daugherty | ............... | G06F 21/577 |
| 2021/0110044 A1* | 4/2021 | Price | ............... | G06F 21/577 |
| 2021/0194929 A1* | 6/2021 | Garrett | ............... | G06F 21/572 |
| 2021/0350002 A1* | 11/2021 | Hajost | ............... | G06F 21/57 |
| 2021/0409437 A1* | 12/2021 | Roach | ............... | G06Q 30/018 |

* cited by examiner

*Primary Examiner* — Liang Che A Wang
(74) *Attorney, Agent, or Firm* — Shook, Hardy & Bacon L.L.P.

(57) ABSTRACT

The federal government requires organizations it partners with to comply with a higher level of security requirements and issues guideline detailing vulnerabilities within computer systems, assessments to be conducted, and security requirements. Previously, the security assessments required to be in compliance with the government's security requirements were mostly conducted manually, creating a labor and time intensive process. The present disclosure provides computerized systems and methods that intelligently and dynamically conduct automatic security assessments to determine security compliance for one or more applications. These systems and methods significantly improve the security assessment process and result in significant savings of time, labor, and money. The system receives the security requirements, identifies one or more applications to undergo a security assessment, generates a script comprising commands for conducting an automatic assessment of the one or more applications, conducts the security assessments on the one or more applications, determines whether the one or more application are in compliance with the security requirements and generates a report comprising the security assessment findings.

20 Claims, 12 Drawing Sheets

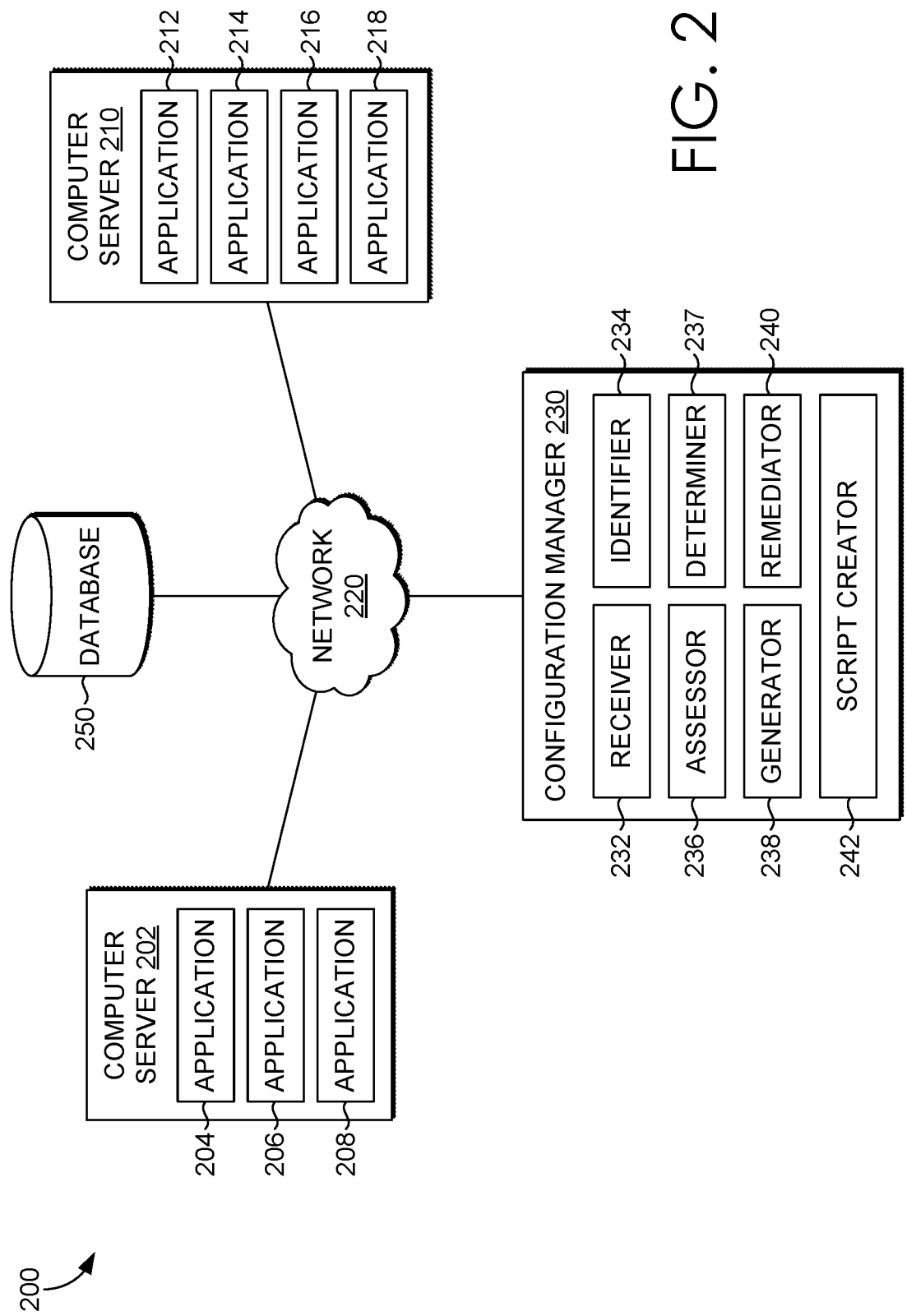

| | A | B | C | D | E | F | G | H | I |
|---|---|---|---|---|---|---|---|---|---|
| 1 | Solution Name | STIG Benchmark Checks (Complete DISA List) | Automated Scans | Supplemental Scans (DISA Manuals that have been Automated) | Pure Manual Checks (STIGS that cannot be automated or that require additional info) | Automated Artifacts (STIGS which require Artifacts from the Host which can be provided by Automation) | Automated Artifacts | Status | Scans can be run Ad Hoc, Automated, or both |
| 10 | IIS Server | 44 | 0 | 15 | 26 | 1 | 0 | Complete | Ad Hoc, SCCM |
| 11 | IIS Site | 54 | 0 | 31 | 23 | 0 | 0 | Complete | Ad Hoc, SCCM |
| 12 | Java JRE v8 | 16 | 0 | 14 | 0 | 2 | 0 | Complete | Ad Hoc, SCCM |
| 21 | Microsoft SQL Server 2012 Instance | 152 | 0 | 19 | 37 | 88 | 0 | Complete | Ad Hoc, SCCM |
| 22 | Microsoft SQL Server 2016 DB | 28 | 0 | 4 | 8 | 13 | 3 | Complete | Ad Hoc, SCCM |
| 23 | Microsoft SQL Server 2016 Instance | 118 | 0 | 43 | 15 | 60 | 0 | Complete | Ad Hoc, SCCM |
| 24 | Microsoft Windows v2012r2 | 336 | 261 | 49 | 19 | 6 | 1 | Complete | Ad Hoc, SCCM |
| 25 | Microsoft Windows v2016 | 272 | 205 | 27 | 8 | 4 | 4 | Complete | Ad Hoc, SCCM |
| 26 | Windows Firewall | 21 | 20 | 0 | 1 | 0 | 0 | Complete | Ad Hoc, SCCM |
| 27 | Vmware VM Check | 43 | 0 | 41 | 2 | 0 | 0 | Complete | Ad Hoc, SCCM |
| 28 | Total STIGS | 1649 | 969 | 267 | 173 | 186 | 8 | | |
| 29 | | | | | | | | | |

```
┌─────────────────────────────────────────────────────────────────────────────────────┐
│ ☐ Administrator: Command Prompt                                                     │
│                                                                                     │
│ SCAN OPTIONS:                                                                       │
│                                                                                     │
│   Acrobat              - Run Adobe Acrobat Scanner                                  │
│   Chrome               - Run Google Chrome Scanner                                  │
│   CitrixDC             - Run Citrix XenApp Delivery Controller Scanner              │
│   CitrixLicense        - Run Citrix License Server Scanner                          │
│   CitrixStoreFront     - Run Citrix StoreFront Server Scanner                       │
│   CitrixXenApp         - Run Citrix XenApp VDA Scanner                              │
│   Defender                             - Run Windows Defender Scanner               │
│   DotNet4              - Run Microsoft .Net v4 Scanner                              │
│   Firewall             - Run Microsoft Windows Firewall Scanner                     │
│   IE11                 - Run Microsoft Internet Explorer v11 Scanner                │
│   IISSVR               - Run Microsoft IIS v8.5/10 Server Scanner                   │
│   IISSTE               - Run Microsoft IIS v8.5/10 Site Scanner                     │
│   Java                 - Run Oracle Java Scanner                                    │
│   McAfee               - Run McAfee Antivirus Scanner                               │
│   Excel2010            - Run Microsoft Excel 2010 Scanner                           │
│   Excel1016            - Run Microsoft Excel 2016 Scanner                           │
│   Word2010             - Run Microsoft Word 2010 Scanner                            │
│   Word2016             - Run Microsoft Word 2016 Scanner                            │
│   Office2010           - Run Microsoft Office System 2010 Scanner                   │
│   Office2016           - Run Microsoft Office System 2016 Scanner                   │
│   SQL2012DB            - Run Microsoft SQL Server 2012 Database Scanner             │
│   SQL2012IN            - Run Microsoft SQL Server 2012 Instance Scanner             │
│   SQL2016DB            - Run Microsoft SQL Server 2016 Database Scanner             │
│   SQL2016IN            - Run Microsoft SQL Server 2016 Instance Scanner             │
│   VMWare               - Run VMWare VM Scanner                                      │
│   Win2012              - Run Microsoft Windows 2012r2 Scanner                       │
│   Win2012DC            - Run Microsoft Windows 2012r2 Domain Controller Scanner     │
│   Win2016              - Run Microsoft Windows 2016 Scanner                         │
│   All                  - Run all Scans in sequence                                  │
│                                                                                     │
│ SWITCHES (MANDATORY):                                                               │
│                                                                                     │
│   "-Scans"        Followed by the Scan(s) you would like to run.                    │
│   "-Directory"    Followed by the directory where you want to store the log         │
│                   file and possible screenshots. (Note: if there are spaces         │
│                   in the path, you MUST use quotes around the path)                 │
│                                                                                     │
│ SWITCHES (OPTIONAL):                                                                │
│                                                                                     │
│   "-Screenshots"  Generate screenshots/artifacts for passing vulnerabilities        │
│                   that are classified as "manual".                                  │
│                                                                                     │
│ EXAMPLES:                                                                           │
│                                                                                     │
│ C:\temp> assess.exe -Scans All -Directory c:\temp\assess                            │
│ C:\temp> assess.exe -Scans DotNet4 -Directory "\\FileShare\secutility\MyScans"      │
│ C:\temp> assess.exe -Scans Java,Excel2016,Word2016 -Directory C:\temp\assess -Screenshots │
│ C:\temp> assess.exe -Scans McAfee,Acrobat,Chrome -Directory c:\temp\assess          │
│ C:\temp> assess.exe -Scans Win2012,Word2016,Excel2010 -Directory c:\temp\assess -Screenshots │
│ ###################################################################################### │
│                                                                                     │
│                                                                                     │
│ C:\temp>assess.exe -scans iissvr -directory c:\temp\assessoutput                    │
└─────────────────────────────────────────────────────────────────────────────────────┘
```

FIG. 4

```
Transcript started, output file is c:\temp\assessoutput\Scan.log
Microsoft IIS Server Scan Started.... 
Scanning for vulnerability: V-76679  ~502
Scanning for vulnerability: V-76681  ~504
Scanning for vulnerability: V-76683  ~506
Scanning for vulnerability: V-76685  ~508
Scanning for vulnerability: V-76687
Scanning for vulnerability: V-76689
Scanning for vulnerability: V-76695
Scanning for vulnerability: V-76697
Scanning for vulnerability: V-76699
Scanning for vulnerability: V-76701
Scanning for vulnerability: V-76703
Scanning for vulnerability: V-76705
Scanning for vulnerability: V-76707
Scanning for vulnerability: V-76709
Scanning for vulnerability: V-76711

100%
Scanning for vulnerability: V-76713
Scanning for vulnerability: V-76715
Scanning for vulnerability: V-76717 - This will take a few minutes....
```

W3C Logging Fields

Standard Fields:
- ☑ Date (date)
- ☑ Time (time)
- ☑ Client IP Address (c-ip)
- ☑ User Name (cs-username)
- ☐ Service Name (s-sitename)
- ☐ Server Name (s-computername)
- ☑ Server IP Address (s-ip)
- ☑ Server Port (s-port)
- ☑ Method (cs-method)
- ☑ URI Stem (cs-uri-stem)
- ☑ URI Query (cs-uri-query)
- ☑ Protocol Status (sc-status)
- ☑ Protocol Substatus (sc-substatus)

708

Custom Fields:

| Log Field | Source Type | Source |
|---|---|---|
| Connection | Request Header | Connection |
| Warning | Request Header | Warning |
| Authorization | Request Header | Authorization |
| ContentType | Request Header | Content-Type |

[Add Field...] [Remove Field...] [Edit Field...]

[OK] [Cancel]

```
802 — Date/Time: 10/29/2019 13:29:49
804 — Hostname: TEST_SERVER
806 — IPV4Address: 127.0.0.1

VulnID     : V-79061 — 808
       RuleID     : SV-93767r1_rule — 810
       ScanResult : Pass — 812
812 — Evidence   : SQL Query Result = Windows NT Authentication
814 — Procedure  : Invoke-Sqlcmd -query "EXEC master.sys.xp_loginconfig 'login mode'" -ServerInstance TEST_SERVER
```

FIG. 8

```
1   <?xml version="1.0" encoding="utf-8"?>
2   <SUPPSCAN>
3     <SCAN_TOOL>
4       <SCAN_TOOL_NAME>ABCD</SCAN_TOOL_NAME>
5       <SCAN_TOOL_VERSION>1.0.8.4</SCAN_TOOL_VERSION>
6       <SCRIPT_NAME />
7       <SCRIPT_VERSION />
8       <SCAN_START_TIME>01/16/2020 13:20:52</SCAN_START_TIME>
9       <SCAN_END_TIME>01/16/2020 13:31:40</SCAN_END_TIME>
10    </SCAN_TOOL>
11    <ASSET>
12      <HOST_NAME>TEST_SERVER</HOST_NAME>
13      <HOST_IP>127.0.0.1</HOST_IP>
14      <HOST_FQDN>TEST_SERVER.northamerica.hostdomain.net</HOST_FQDN>
15    </ASSET>
16    <VULN>
17      <VULN_NUM>V-76679</VULN_NUM>
18      <RULE_ID>SV-91375r1_rule</RULE_ID>
19      <STATUS>Open</STATUS>
20      <FINDING_DETAILS>TEST_SERVER
21      127.0.0.1
22      01/16/2020 13:31:40
23      </FINDING_DETAILS>
24      <COMMENTS>Manual Steps Required</COMMENTS>
25    </VULN>
26    <VULN>
27      <VULN_NUM>V-76681</VULN_NUM>
28      <RULE_ID>SV-91377r1_rule</RULE_ID>
29      <STATUS>NotAFinding</STATUS>
30      <FINDING_DETAILS>TEST_SERVER
31
```

AUTOMATED SECURITY ASSESSMENT SYSTEMS

BACKGROUND

Many different types of organizations enter into business contracts with the government to provide a variety of services. For example, the federal government often contracts out the manufacturing of various items needed by the armed forces. Additionally, the government enters into contracts with various healthcare related companies, such as healthcare software companies to provide electronic medical records and other systems for the medical facilities run by the government, such as the Veterans Administration clinics and hospitals. Often times the services contracted, such as the utilization of electronic medical record software, requires the use and transmission of confidential and sensitive information across different systems and servers. In an attempt to protect confidential information, the federal government, via the Defense Information Security Agency (DISA), mandates companies to comply with a higher level of security compliance than what is required in other commercial settings. The security requirements mandated by DISA are configuration settings that are published in Security Technical Implementation Guidelines (STIG). Historically, in order to assess compliance with the security requirements mandated in the STIGs, applications identified underwent manual security assessments provide verification of compliance, which including generating a variety of different types of evidence to transmit as proof of compliance to the government. As one can imagine, in situations where an organization working with the federal government has hundreds or thousands of servers operating, the process of assessing each application or program identified on each server to confirm compliance with STIG security requirements is an enormous undertaking which requires significant manpower, thousands of hours of work, and costs organizations large sums of money that may result in lost or diminished profits.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims.

In order to comply with the security requirements found in STIGS issued by the DISA, organizations working with the federal government, must conduct audits or assessments on their systems to ensure that their systems are compliant with the security requirements. Some of the assessments to be conducted have been previously automated, but there are hundreds of current assessments required that must be done manually. As such, each of the assessments that remain manual require the system owner (e.g. the organization) to individually assess each application and produce screenshots and other documentation for each assessment completed as evidence of the assessment and compliance. Depending on the size of the system, such manual assessments could require thousands of hours of work. As such, a system that could automate the assessment of applications that are currently manual while meeting the requirements established in the STIGs would create efficiency, save time, and significantly decrease the cost associated with the required security compliance assessments. The amount of manpower that is freed from such manual tasks could instead focus on completing the projects related to the actual services being provided.

Embodiments of the present invention generally relate to computerized systems and methods that facilitate automatic security assessments to determine security compliance for one or more applications or programs on one or more servers. In general, the system is configured to receive one or more security requirements from at least one STIG and identifies one or more applications to undergo a security assessment to determine a compliance status with one or more of the security requirements received. Once the one or more applications are identified, the system generates a script based on the one or more security requirements and the one or more applications identified, wherein the script comprises commands for conducting an automatic security assessment of the one or more applications. Following that, the system automatically conducts the security assessment on the one or more application based on configuration settings described in the STIG. Once the assessment is completed, the system determines whether the one or more applications satisfy the one or more security requirements. In other words, the system determines whether the one or more applications are compliant or non-compliant with the security requirements. Following this, the system generates a report that indicates whether the one or more applications assessed satisfy the one or more security requirements. Further, in circumstances where it is determined that that the one or more application is non-compliant or failed the assessment (meaning that the one or more applications does not satisfy at least one or more security requirements outlined in the STIG), the non-compliance may be remediated so that the one or more applications becomes compliant with the security requirements. Evidence of such remediation is submitted to the government to establish compliance with the security requirements outlined by the STIGs.

BRIEF DESCRIPTION OF THE SEVERAL VIEWS OF THE DRAWINGS

The present invention is described in detail below with reference to the attached drawing figures, wherein:

FIG. 2 illustrates an exemplary system architecture suitable to implement embodiments of the present invention;

FIG. 3 illustrates an exemplary chart comprising sample solutions that undergo security assessments to determine compliance with STIG security requirements;

FIG. 4 illustrates an exemplary image of the automated assessment system command prompt;

FIG. 5A illustrates an exemplary transcript detailing the output of an assessment of one or more applications prompted from the command prompt of FIG. 4;

FIG. 6 illustrates an exemplary STIG manual comprising exemplary security requirements for an exemplary vulnerability;

FIG. 7 illustrates an exemplary output comprising a screenshot depicting the details of a manual security assessment process;

FIG. 8 is an exemplary assessment log produced after the completion of an exemplary automated security assessment;

FIGS. 9A-9B illustrate an exemplary report generated after the automatic security assessment is completed comprising the status of compliance with security requirements received from STIGs.

DETAILED DESCRIPTION

Figure 1:
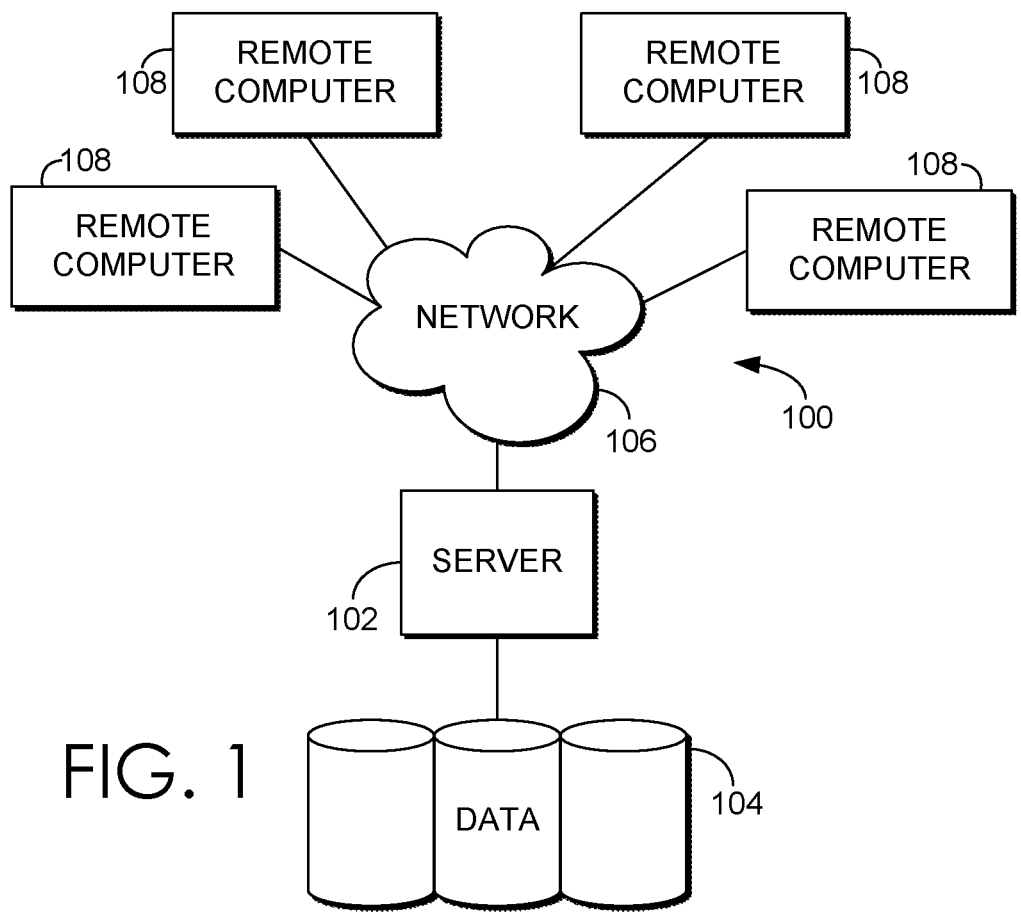
FIG. 1 illustrates a block diagram of an exemplary system architecture in which embodiments of the invention may be employed.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

As one can imagine, in various systems, such as large healthcare systems, changes to software and applications are made continuously to adapt to the changing needs of healthcare providers, patients, administration, and regulations. As such, there is a significant amount of personal and confidential information that is at risk if the proper security protection are not in place. Additionally, systems, such as healthcare IT systems, that are interacting with the federal government's information technology (e.g. government servers) may also contain additional confidential or classified information. Unfortunately, the current technological world is filled with potential vulnerabilities that put confidential data at risk. Therefore, most systems that contain confidential or personal information require compliance with various security protocols and standards. The federal government requires organizations that it is working with to meet higher security standards in order to decrease risks of hacking and inappropriate dissemination of confidential data.

To implement these security requirements, the government, via the Defense Information Security Agency, has mandated what is required to meet the government's security standards in the STIGs issued. The STIGs are a cybersecurity methodology for standardizing security protocols within networks, servers, computers, and logical designs to enhance security. The STIGs describes how to minimize network-based attacks and prevent system access when the attacker is interfacing with the system.

To date, the DISA has released over 400 STIGs related to hundreds of application or programs. Each STIG may additionally contain dozens to hundreds of technical controls that must be tested for compliance with the security requirements outlined in the STIGs. While the DISA provides the security requirements and tools for validating, assessing, and implementing the security requirements, many of the tools provided for the assessments remain manual. As such, a separate manual assessment must be conducted for each application or software identified, which requires significant time and effort. This creates a huge burden on the IT departments for organizations, which already tended to be overburdened with other technical projects. Given the exponential increase in work that results from the required compliance with the STIGs by the government, a system that can automate manual security assessments and reporting would greatly decrease the burden on the organization, increase efficiency, and save both time and significant costs by eliminating the need for thousands of manual security assessments do be conducted.

As described herein, the automated assessment system is orchestrated through a configuration management tool, which conducts security assessments and produces evidence to meet security requirements. Additionally, the system is designed intelligently, so that it can be upgraded as DISA's requirements change. Further, the system can generate evidence regarding compliance in a variety of ways including generating reports, screenshots, artifacts, and other documentation files. This system can also be incorporated into other systems and can extend into the corporate space enabling visibility to commercial configuration requirements. The automation of the individual assessments saves thousands of man hours in running assessments, generating reports, and remediating applications that do not comply with the STIG requirements. The system allows an individual to scan one or more servers on demand and then automatically produce output that is easily readable and actionable for remediating any issues found in the report.

Beginning with FIG. 1, an exemplary computing environment suitable for use in implementing embodiments of the present invention is shown. FIG. 1 is an exemplary computing environment (e.g., health-information computing-system environment) with which embodiments of the present invention may be implemented. The computing environment is illustrated and designated generally as reference numeral 100. The computing environment 100 is merely an example of one suitable computing environment and is not intended to suggest any limitation as to the scope of use or functionality of the invention. Neither should the computing environment 100 be interpreted as having any dependency or requirement relating to any single component or combination of components illustrated therein. It will be appreciated by those having ordinary skill in the art that the connections illustrated in FIG. 1 are also exemplary as other methods, hardware, software, and devices for establishing a communications link between the components, devices, systems, and entities, as shown in FIG. 1, may be utilized in the implementation of the present invention. Although the connections are depicted using one or more solid lines, it will be understood by those having ordinary skill in the art that the exemplary connections of FIG. 1 may be hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though devices and components are represented in FIG. 1 as singular devices and components, it will be appreciated that some embodiments may include a plurality of the devices and components such that FIG. 1 should not be considered as limiting the number of a device or component.

The present technology might be operational with numerous other special-purpose computing system environments or configurations. Examples of well-known computing systems, environments, and/or configurations that might be suitable for use with the present invention include personal computers, server computers, hand-held or laptop devices, multiprocessor systems, microprocessor-based systems, set-top boxes, programmable consumer electronics, network PCs, minicomputers, mainframe computers, distributed computing environments that include any of the above-mentioned systems or devices, and the like.

The present invention may be operational and/or implemented across computing system environments such as a distributed or wireless "cloud" system. Cloud-based computing systems include a model of networked enterprise storage where data is stored in virtualized storage pools. The cloud-based networked enterprise storage may be public, private, or hosted by a third party, in embodiments. In some embodiments, computer programs or software (e.g., applications) are stored in the cloud and executed in the cloud. Generally, computing devices may access the cloud over a wireless network and any information stored in the cloud or computer programs run from the cloud. Accordingly, a cloud-based computing system may be distributed across multiple physical locations.

The present technology might be described in the context of computer-executable instructions, such as program modules, being executed by a computer. Exemplary program modules comprise routines, programs, objects, components, and data structures that perform particular tasks or implement particular abstract data types. The present invention might be practiced in distributed computing environments where tasks are performed by remote processing devices that are linked through a communications network. In a distributed computing environment, program modules might be located in association with local and/or remote computer storage media (e.g., memory storage devices).

With continued reference to FIG. 1, the computing environment 100 comprises a computing device in the form of a control server 102. Exemplary components of the control server 102 comprise a processing unit, internal system memory, and a suitable system bus for coupling various system components, including data store 104, with the control server 102. The system bus might be any of several types of bus structures, including a memory bus or memory controller, a peripheral bus, and a local bus, using any of a variety of bus architectures. Exemplary architectures comprise Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

The control server 102 typically includes therein, or has access to, a variety of non-transitory computer-readable media. Computer-readable media can be any available media that might be accessed by control server 102, and includes volatile and nonvolatile media, as well as, removable and nonremovable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by control server 102. Computer-readable media does not include signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The control server 102 might operate in a computer network 106 using logical connections to one or more remote computers 108. Remote computers 108 might be located at a variety of locations including operating systems, device drivers and the like. The remote computers might also be physically located in traditional and nontraditional clinical environments so that the entire medical community might be capable of integration on the network. The remote computers might be personal computers, servers, routers, network PCs, peer devices, other common network nodes, or the like and might comprise some or all of the elements described above in relation to the control server. The devices can be personal digital assistants or other like devices. Further, remote computers may be located in a variety of locations including in a medical or research environment, including clinical laboratories (e.g., molecular diagnostic laboratories), hospitals and other inpatient settings, veterinary environments, ambulatory settings, medical billing and financial offices, hospital administration settings, home healthcare environments, and clinicians' offices. Healthcare providers may comprise a treating physician or physicians; specialists such as surgeons, radiologists, cardiologists, and oncologists; emergency medical technicians; physicians' assistants; nurse practitioners; nurses; nurses' aides; pharmacists; dieticians; microbiologists; laboratory experts; laboratory technologists; genetic counselors; researchers; veterinarians; students; and the like. The remote computers 108 might also be physically located in nontraditional clinical environments so that the entire medical community might be capable of integration on the network. The remote computers 108 might be personal computers, servers, routers, network PCs, peer devices, other common network nodes, or the like and might comprise some or all of the elements described above in relation to the control server 102. The devices can be personal digital assistants or other like devices.

Computer networks 106 comprise local area networks (LANs) and/or wide area networks (WANs). Such networking environments are commonplace in offices, enterprise-wide computer networks, intranets, and the Internet. When utilized in a WAN networking environment, the control server 102 might comprise a modem or other means for establishing communications over the WAN, such as the Internet. In a networking environment, program modules or portions thereof might be stored in association with the control server 102, the data store 104, or any of the remote computers 108. For example, various application programs may reside on the memory associated with any one or more of the remote computers 108. It will be appreciated by those of ordinary skill in the art that the network connections shown are exemplary and other means of establishing a communications link between the computers (e.g., control server 102 and remote computers 108) might be utilized.

In operation, an organization might enter commands and information into the control server 102 or convey the commands and information to the control server 102 via one or more of the remote computers 108 through input devices, such as a keyboard, a microphone (e.g., voice inputs), a touch screen, a pointing device (commonly referred to as a mouse), a trackball, or a touch pad. Other input devices comprise satellite dishes, scanners, or the like. Commands and information might also be sent directly from a remote medical device to the control server 102. In addition to a monitor, the control server 102 and/or remote computers 108 might comprise other peripheral output devices, such as speakers and a printer.

Although many other internal components of the control server 102 and the remote computers 108 are not shown, such components and their interconnection are well known. Accordingly, additional details concerning the internal construction of the control server 102 and the remote computers 108 are not further disclosed herein.

Turning now to FIG. 2, an exemplary system 200 for conducting automatic security assessments of one or more applications to determine compliance with security requirements (e.g. those mandated by DISA via the STIGs) is depicted. The exemplary system 200 is merely an example of one suitable system and is not intended to suggest any limitation as to the scope of use or functionality of embodiments of the present invention. Neither should the system 200 be interpreted as having any dependency or requirement related to any single component or combination of components illustrated herein.

The exemplary system 200 comprises at least one computer server 202, at least one application 204, a configuration manager 230, a database 250, and a network 220. As shown in FIG. 2, there may be more than one server (servers 202 and 210) and more than one application located within each server (applications 204, 206, and 208 located within server 202 and applications 212, 214, 216, and 218 located within server 210). Each server 202 or 210 may include equal or unequal numbers of application.

The database 250 may be located remotely or on the cloud. Additionally, the database 250 is where the reports generated regarding compliance after an assessment is conducted may be stored. Further, the database 250 may store STIGs to be utilized for the security assessments. As will be discussed in more detail, a receiver 232 will receive one or more security requirements from a first source, such as the STIG. Upon receiving the security requirements, the identifier 234 will identify one or more applications to be assessed for compliance with the one or more security requirements received. The applications to be assessed will be based on the STIGs and the individual system.

The government has released over 400 STIGs to conduct security assessments on various different applications that may or may not be a part of each system. As such, based on structure of the current organization and the applications being used within the organization's one or more servers, different applications will be identified for security assessment. After the one or more applications are identified for security assessment, the script creator will generate a script based on the one or more security requirements and the one or more applications identified, wherein the script comprises commands for conducting an automatic security assessment of the one or more applications. Utilizing the script created, the assessor 236 will automatically conduct security assessments on the one or more application identified.

Each STIG may contain hundreds of technical controls which are classified in a coded naming system. For example, for each potential vulnerability identified within an application that may be in use on a server, such as server 202, the STIG will identify each potential vulnerability to be scanned or assessed by a code name (e.g. V-755879). After the assessor 236 conducts the assessment or audit on the one or more applications, the determiner 237 will determine whether the one or more applications is in compliance with the security requirements received. In other words, the determiner 237 will determine if the one or more application scanned are compliant or non-compliant. Non-compliant applications will be those that are vulnerable and pose security risks to the system. After the determiner 237 makes the determination, the generator 238 will generate a report indicating whether the one or more applications assessed by the assessor 236 satisfy the one or more security requirements from the STIGs. The report may include snapshots of the assessment or may be generated in any data file acceptable for submission to the government. Once completed, the report may be transmitted to the government to provide validation of compliance with the security requirements outlined in the STIGs. If found non-compliant, a remediator 240 may remediate one or more issues found so that the one or more applications become compliant with the security requirements.

As depicted, the system 200 is comprised of a configuration manager 230, but it is contemplated the system 200 may include more than configuration manager 230. It will be appreciated that some or all of the subcomponents of the configuration manager 230 may be accessed via the network 220 and may reside on one or more devices. Further, in some embodiments, one or more of the illustrated components may be implemented as a stand-alone application. The components described are exemplary in nature and in number and should not be construed as limiting. Any number of components may be employed to achieve the desired functionality within the scope of the embodiments hereof.

Generally, the configuration manager 230 is configured to dynamically manage automatic security assessment of one or more applications within a system to determine whether the applications are compliant with the security requirements detailed in the STIGs issued by DISA. In embodiments, the configuration manager 230 may be configured to access the at least one server 202 at any time based on receiving one or more security requirements. As shown, the configuration manager 230 is comprised of several components including: a receiver 232, an identifier 234, an assessor 236, a determiner 237, a generator 238, a remediator 240, and a script creator 242. In other embodiments, the configuration manager 230 may include any number of components necessary for the dynamic testing of one or more changes to one or more applications.

The receiver 232 within the configuration manager 230 is configured to receive one or more security requirements from at least a first source. In aspects, the first source a STIG issued by the DISA. However, it is contemplated that in other aspects, the receiver 232 may receive security requirements from other sources. As mentioned, the security requirements outlined in the STIGs issued by the DISA are configuration settings that systems used in conjunction with the Department of Defense must comply with. To be compliant, the system 200 must comply with technical testing and hardening frameworks that are outlined in the STIGs. The purpose of the STIGs is to enhance overall security. When the STIGs are implemented, the security of hardware, physical and logical architecture is enhanced to reduce potential vulnerabilities. In the automatic security assessment system described herein, the receiver 232 may receive multiple security requirements for multiple different applications present on the computer servers 202/210. As will be described further, the security requirements will identify the potential vulnerability with a vulnerability ID (e.g. V-67995)

or code name, the version of the vulnerability, the rule associated, the severity of the vulnerability (high, medium, low, etc.) and a description that outlines the issue, potential vulnerabilities and outcomes of attacks, and what the specific security requirement applies to. Additionally, the STIGs describe how to conduct the assessment to determine compliance.

The receiver 232 may receive the one or more security requirements on a variety of schedules or timetables based on the DOD's requirements. For example, an organization may be required to conduct assessments or audits of its systems twice a year. Other organizations may be required to conduct assessments more or less frequently. The receiver 232 will receive the security requirements based on the security assessment requirements issued by the government and the system 200's features (e.g. which applications 204/206/208 etc. are present on the server 202/210 and which of these applications require security assessment based on the STIGs). Additionally, the system 200 may intelligently receive updates to the STIGs issued by the DISA or based on the system's own changes or updates, may proactively communicate with database 250 or the cloud (not shown) where the STIGs may be stored and continuously updated in order to receive the most up to date and applicable security requirements related to the applications present in the system.

Once the receiver 232 has received the one or more security requirements from one or more STIGs, the identifier 234 will identify one or more applications 204/206/208/212/214/216/218 on servers 202 or 210 that need to be assessed to determine compliance with the one or more security requirements received. The determination of which applications will be assessed for security compliance will be based on the specific STIGS. As such, not all applications on the servers 202 and 210 will necessarily be assessed for security compliance during each assessment conducted by the system 200. As mentioned above, each specific STIG will describe each and every potential vulnerability to be assessed and identify each vulnerability with the vulnerability ID. The vulnerability ID will correspond to one or more different applications. Therefore, the identifier 234 will identify which applications to be assessed based on the vulnerability IDs and details outlined in each STIG.

Based on the security requirements received by the receiver 232, a script creator 242 creates a script that describes the automated security assessment to be completed by the system 200. For example, FIG. 4 at 412, states the code for the application to be scanned/assessed and the output to be generated. The creation of the unique script by the script creator 242 further distinguishes the automated security assessment system by allowing the system 200 to bypass the manual assessment process outlined in the STIGs and instead, utilize the scripts created to run automated security assessments for all applications identified based on the STIG security requirements received. This eliminates the need to individually run assessments on each application that must be assessed for compliance with the security requirements.

After the one or more applications to be assessed for security compliance are identified by the identifier 234, the assessor 236 will conduct an automatic security assessment of the one or more applications utilizing the script created by the script creator 242. While government has provided automatic assessments for certain applications on systems, there are still numerous applications that have to be manually assessed. This requires individual manpower and time to review the STIG for the security requirements and vulnerability ID, identify the application corresponding to the vulnerability identified, and conduct a step-by-step assessment outlined in the STIGs. Once the manual security assessment is completed, screenshots or other types of digital evidence would need to be produced to submit to the government to confirm that the security requirements have been satisfied. This process is not only tedious and lengthy, but when there are potentially thousands of applications to be assessed, it will require thousands of hours of manpower and be expensive.

To resolve this issue, the present system has created improvements to the security assessment of the applications identified by the identifier 234. Unlike previous systems, the current system 200 has automated the security assessment of multiple additional applications based on the requirements established in the STIGs and utilizing the script generated by the script creator 242. By automating such security assessments, the security assessment process conducted by the assessor 236 will be faster, more efficient, and less costly. For example, if there are 500 applications identified by the identifier 234 to be scanned and assessed in order to determine compliance with specific security requirements outlined in the STIGs, the assessor 236's automatic assessment may be able to scan each application identified in a matter of minutes rather than hours or days. This improvement will allow the system 200 to provide verification to the government that that the applications are in compliance with the security requirements much faster and will also for the remediation of non-compliant applications much faster. This in turn, may also have the benefit of correcting vulnerabilities faster, thereby potentially decreasing the chances of breaches or eliminating the potential for certain breaches.

Once the security assessment has been conducted by the assessor 236, the determiner 237 analyzes the security assessment of the one or more applications and determines whether the one or more application satisfy the one or more requirements received from the STIGs. The determiner 237 relies on the information provided in the STIGs to determine whether to conclude that the one or more applications are compliant or are non-compliant with the security requirements. In some aspects, an application may be determined by the determiner 237 to be non-compliant when even a minor issue is detected in the security assessment. In other instances, the determiner 237 may determine non-compliance only where there is a fatal or catastrophic type of issue found during the assessment. As such, there may be instances where the security assessment does not result in a finding of one-hundred percent compliance with each risk identified in the STIGs, but overall, the application may still be compliant as the deficient is minor and does not increase the vulnerability of the application or put the application at risk for attack. By automating the assessment of multiple applications at the same time, the determiner 237 will analyze and process the security assessment data and make compliance determinations for multiple application at the same time as well.

Following the determination of compliance of the one or more applications with the one or more security requirements, a generator 238 will generate a report to be submitted to the government indicating the status of compliance for the one or more applications that were assessed. The format and content of the report generated by the generator 238 may vary based on the system and government's needs. Prior to the automation of the assessment of one or more applications, the documentation provided to the government to verify the status of compliance often required multiple different types of evidence, making the assessment process even lengthier and more burdensome. However, the reports generated by the generator 238 in the present system have simplified the documentation to be presented and eliminated the need for several screenshots and documents to verify compliance status. Instead, as will be discussed below, the report generated shows the detailed information regarding the security assessment (e.g. date, identification of the individual who ran the assessment, the vulnerability ID from the relevant STIG, and the status of compliance—compliant, non-compliant, pass or fail). This report can then be electronically sent to the government for review and confirmation that the application assessed is in compliance with the security requirements outlined by the DOD via the DISA.

In instances where the determiner 237 determines that an application is not compliant with the security requirements based on the assessment conducted by the assessor 236, the remediator 240 will remediate the issue found so that the application will be in compliance with the security requirements. In some aspects, once the remediator 240 resolves the issue that caused the non-compliance, the assessor may re-assess the application (e.g. re-scan or re-audit the application) to determine whether the application now satisfies the security requirements received for that application, thereby resulting in a compliant application. In this instance, the determiner 237 will make a second determination and the generator 240 will generate a second report indicating the status of compliance after the remediation by the remediator 240. It is contemplated that the assessor 236 may continue to repeat conducting assessments until the application is in compliance with the security requirements.

Next to FIG. 3 depicts an exemplary chart 300 comprising sample solutions that undergo assessment to determine compliance with the STIGs' security requirements. As shown, chart 300 includes a column 302 which lists various solution or application names that are identified by the identifier 234 to be assessed by assessor 236 so that the determiner 237 can determine whether or not each solution found in column 302 satisfies the security requirements received by receiver 232 and is in compliance with the STIGs. In the exemplary chart 300, 10 solutions have been identified by identifier 234 for assessment including the IIS server 320, various Microsoft® SQL servers 326, 328, 330, 332, 334, Windows® Firewall 338, and Vmware VM check 340. Column 304 depicts the STIG benchmark checks or the complete list of security assessments needed that correspond to each of the solutions identified in column 302. For example, there are 44 checks or security assessments to be completed for the IIS Server 320. In total 1,649 security assessments are identified to be completed on the system 200.

As mentioned, of the total 1,649 assessments to be completed on the solutions listed in column 302, only some of the security assessments were previously automated. For example, for the IIS server 322, there were 0 assessments that had been previously automated. This means that each of the 44 checks or assessments identified in column 304 needed to be conducted manually. By contrast, for Windows® Firewall 338, there were previously 20 checks or assessments that were automated. To improve the current processes of reporting security compliance to the government based on the STIGs issued by the DISA, column 308 depicts the number of checks or assessments that the present system 200 has automated, via the script created by the script creator 242, to streamline the security assessment and reporting process of security compliance to the government. The ability of the system 200 to automate the security assessments of the solutions identified may also be based on the operating system being used. For example, there may be fewer solutions whose security assessment can be automated in a Windows® based operating system than a Linux® based operating system. This difference may be due to various technical aspects of the components of the operating system and potential limitations of both system 200 and the security requirements detailed in the STIGs.

As shown, the system 200 has automated 15 of the 44 IIS server's 320 checks or security assessments to be completed. While the goal is to automate as many of the security assessments on each solution or application, not all solutions/application assessments may be automated due to either the STIG security requirements, system limitations, or other potential technical or logistical obstacles. However, by automating even a portion, such as 15 of the 44 assessments to be conducted on the IIS server, the system 200 has significantly improved the process of conducting security assessments, thereby decreasing the amount of time and manpower needed to conduct the security assessments, resulting in cost savings. Further, by automating such security assessments, the system 200, as directed by an individual or by the system itself, can initiate the assessments needed as identified in column 304 by the identifier 234. Depending on the type of solution/application found in column 302, the number of assessments that are able to be automated by the system 200 will vary. For example, of the 43 security assessments to be completed on the Vmware VM check 340 solution, the system 200 has been able to automate 41 of the assessments, leaving only two remaining assessments that must be conducted manually. Those assessments or checks that remain manual are shown in column 308, which lists the STIGs that cannot be automated or require additional information. As shown in column 308, the system 200 has been able to automate an additional 267 assessments.

In addition to the automation of the security assessments, the system 200 may further automate the generation of data integrity verification artifacts as shown in column 314. Automated artifacts required to verify compliance with the security requirements outlined in the STIGs may include, but are not limited to, digital signatures and cryptographic keys, provide additional evidence that the vulnerability assessed is compliant with the STIGs' security requirements. For example, for IIS server 320, the system 200 is unable to automate the creation of any artifacts. By contrast, for the security assessment of Microsoft® Windows® v2016 334, four artifacts are automated. The exemplary chart 300 also depicts the status of the security assessment at column 316 and column 318 depicts whether the security assessments or scans can be run ad hoc, automated or both.

Next, FIG. 4 illustrates the automated security assessment system 200's command prompt 400. In the command prompt 400 shown, the scan or security assessment options 402 are detailed. The scan options 402 include the list of solutions or applications that are to be scanned or assessed for compliance with the security requirements received. In this example, the solutions included as scan options 402 include Acrobat, Chrome, Citrix applications, Excel and several more. Adjacent to the name of the solution that can be assessed is the command. For example, for Acrobat 416 the command prompt states to "Run Adobe Acrobat Scanner" which corresponds to the automated security assessment that the system 200 created. The command prompt 400 also comprises "screenshots" 404 which command screenshots or artifacts for passing vulnerabilities that are classified as manual. In other words, those assessments that could not be automated (shown in FIG. 3 at column 312), will require snapshots and/or artifacts to verify that the solution or application assessed is in compliance with the security requirements outlined in the applicable STIG.

Examples of commands generated by the system 200, based on the one or more applications identified by identifier 234 for security assessment, include commands 408 and 410, which describe scanning specific applications. At 412, the command for the automation of the security assessment of the IIS Server 322 identified in column 302 of FIG. 3 is shown. This security assessment or scan of the IIS solution may occur on a predetermined schedule, such as daily or weekly. Additionally, the command states to scan the IIS server and then produce an output that is required by the government to verify compliance with the security requirements. The output of files that are generated may be stored in a separate system (not shown) or in a database, such as database 250 in FIG. 2. Further, it is contemplated that the output generated may be stored in a system that tracks all the potential vulnerabilities identified through both the manual and automated security assessment procedures. The report or output generated by the generator 238 for the scan on the IIS server may be generated in a variety of types of files, including but not limited to extensive markup language (XML) files.

In addition to the generation of a script to be utilized in the automation of the security assessment of one or more applications, another unique feature of the system 200 is the intelligent detection of any vulnerabilities it is aware of based on receiving the security requirements from the STIGs. For example, if a system is running Google Chrome as an application, the system 200 can detect that and will automatically run the required assessment on the application to determine whether the application is in compliance with the security requirements. In other words, the system 200 proactively identifies Google Chrome and automatically conducts the security assessment rather than waiting for it to be done manually. As a result, the system 200 only conducts assessments on the applications that are present on the server, rather than trying to scan for all potential applications outlined in the STIGs.

Figure 5B:
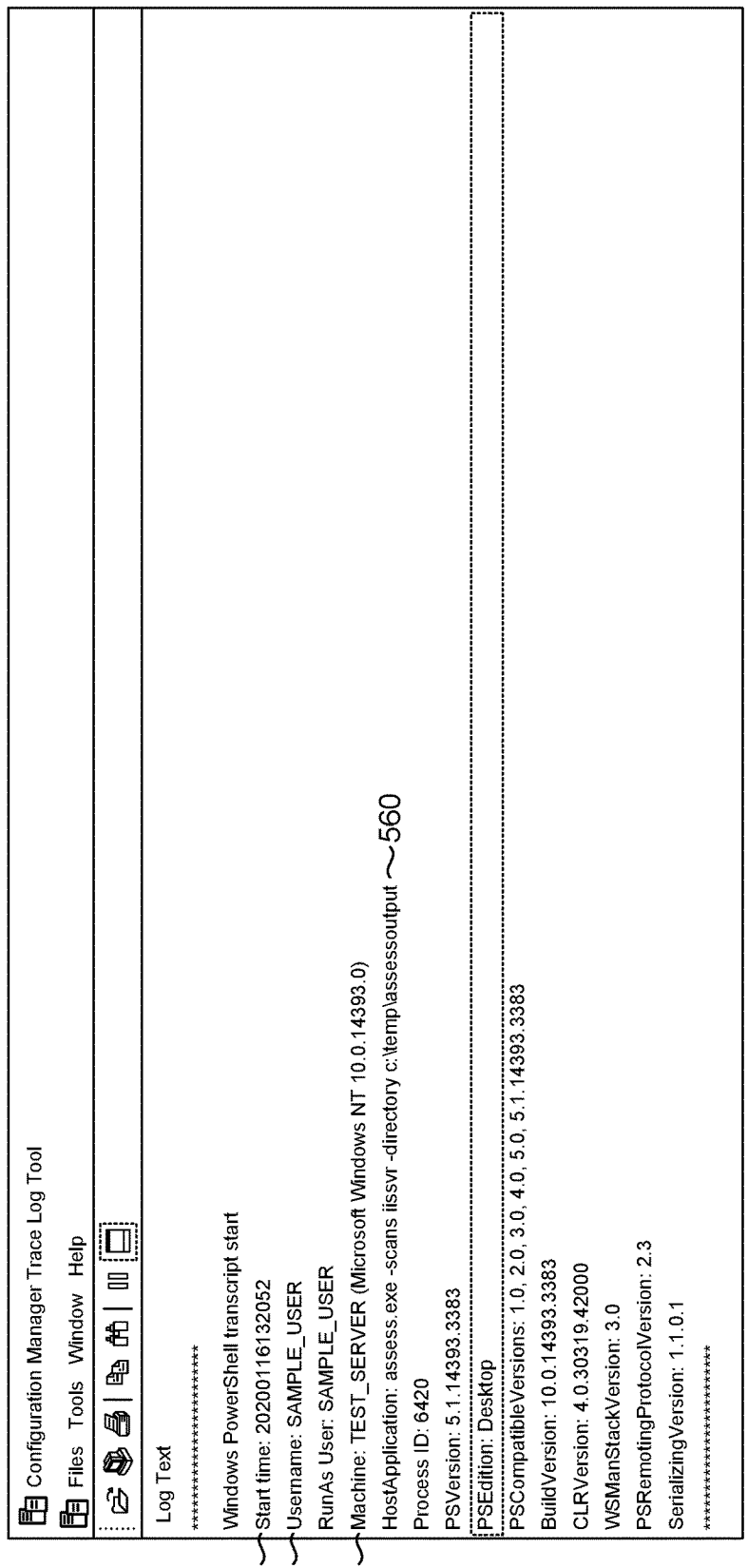
FIG. 5B illustrates an exemplary log file that comprises data regarding the security assessment prompted from the command prompt of FIG. 4.

Next, FIGS. 5A and 5B illustrate the automated assessment process run by the system 200. FIG. 5A illustrates a transcript 500 that details the output of the scan that that was prompted from command 412 in FIG. 4. As shown, the transcript 500 details the assessment/scanning of numerous vulnerabilities identified via vulnerability IDs, such as vulnerability 502, 504, 506, and 508 within the IIS application. As previously mentioned, the vulnerability IDs correspond to specific vulnerabilities identified in the STIGs. At the same time, as shown in the Configuration Manager Trace Log Tool 550 in FIG. 5B, the system 200 also creates a log file detailing when the scan or security assessment took place at 552, the username 554 of the user running the automated assessment, the machine 558 that the assessment is being conducted on, and the host application or solution that is being assessed 560.

Figure 6:
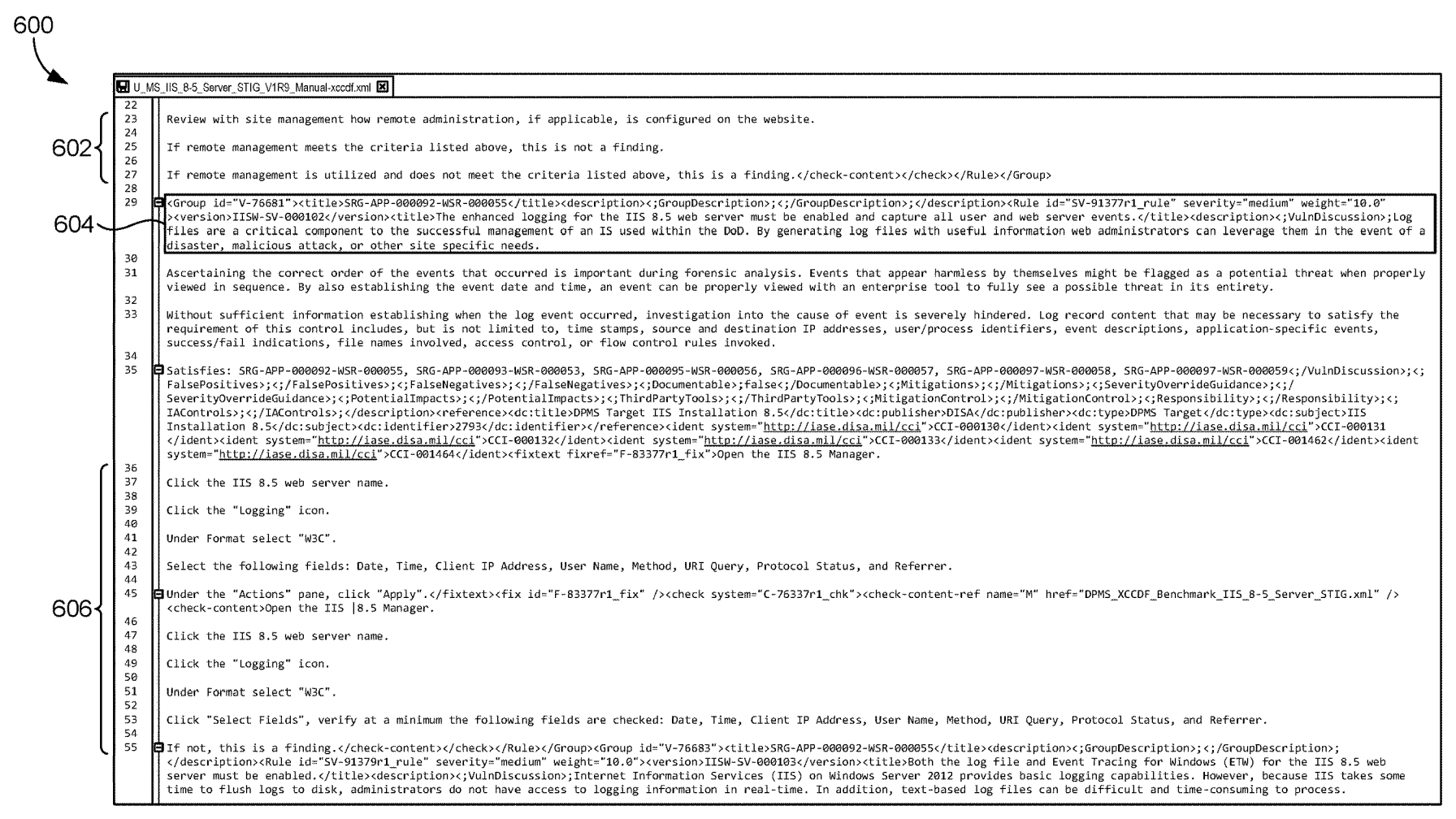

Unlike the simplified automated assessment described herein that results in the transcript 500 and log file in FIGS. 5A and 5B, FIGS. 6-7 illustrate how the security assessment of one or more applications was previously completed in accordance with STIG guidelines. FIG. 6 illustrates the security requirements from an exemplary STIG manual 600 for assessment of vulnerability V-76681, which details how a manual security assessment is conducted to determine compliance with security requirements is conducted. First, the STIG manual 600 describes the steps to initiate the assessment process at 602. Then, at 604, the STIG manual 600 states the vulnerability within an application to be assessed (e.g. V-76681) and the commands to be followed, a description of what the security assessment entails, and what the security requirements are or what the potential vulnerability is. Additionally, the STIG manual 600 describes the steps to be taken to conduct the assessment, shown at 606. The guideline provides the step-by-step directions to manually conduct the assessment.

Additionally, previously, the guidelines required taking a screenshot of the final step which shows all the fields to be assessed. FIG. 7 illustrates an exemplary screenshot 706 that would need to be produced through the manual assessment process. As shown, the screenshot 706 shows fields 708 are checked. Fields 708 include various data such as the date, time, user name, server IP address, and protocol status. In addition to the screenshot 706, evidence would need to be produced showing that any non-compliance was remediated. The screenshot 706 then had to be input into a file to submit to the government detailing where the screenshot 706 came from, what security assessment was conducted, and the status of compliance with the security requirements. Therefore, for a solution such as the IIS solution shown at 322 in FIG. 3, which has 44 assessments to be completed, an individual would need to manually conduct the security assessment 44 times by following the step-by-step process outlined at 606. 44 individual screenshots that would be needed to be included in a file with descriptions of what was assessed, when, and whether or not the security assessment resulted in determining that the security requirements were satisfied.

The reports generated including the screenshots would be transmitted through various levels of review by individuals within an individual organization and within the government. In a system that might include hundreds of solutions or applications to be assessed, each comprising multiple individual assessments based on the STIGs, results in an extremely time consuming and laborious process for both individuals who needed to manually conduct the assessments and those individuals who needed to review the findings of such assessments. Depending on the number of solutions or applications identified for the security assessment and the number of individual security assessments within each application, the findings produced through the manual security assessment system could be so large that review of such findings might be unrealistic. For example, a system completing a security assessment on numerous applications each comprising hundreds of individual assessments for vulnerabilities outlined in the respective STIGs may produce over 50,000 findings for review. As such, the automation of the security assessment of one or more applications based on the security requirements received from the STIG and producing a more simplified report results in an significant decrease in time and labor to produce the same results. Rather than producing several files for each security assessment, the automated security assessment system 200 can produce a single file that details the security assessment completed for all the applications identified to undergo security assessments.

By contrast, FIG. 8 depicts a simplified assessment log 800 generated after the assessor 236 completes the security assessment based on the script creator 242. As shown, assessment log 800 includes the date/time of the assessment 802, the host name 804, and the IP address 806. Additionally, the report comprises the vulnerability ID (V-79061) to correspond to the vulnerability ID received as a part of the security requirements from the applicable STIG. Further, the assessment log 800 states the Rule ID 810, the evidence 812, and the procedure 814, which is the script for the assessment that was automatically conducted. Currently, the exemplary assessment log 800 is output into a file transmitted to the government as evidence of the assessment and status of compliance. However, it is contemplated that in the future, such a report may not be needed and instead the information depicted in FIG. 5A illustrating the transcript of the vulnerabilities (e.g. the multiple assessments within each solution or application identified) may be satisfactory evidence of the assessment and compliance with the security requirements outlined in the STIGs.

Figure 9B:
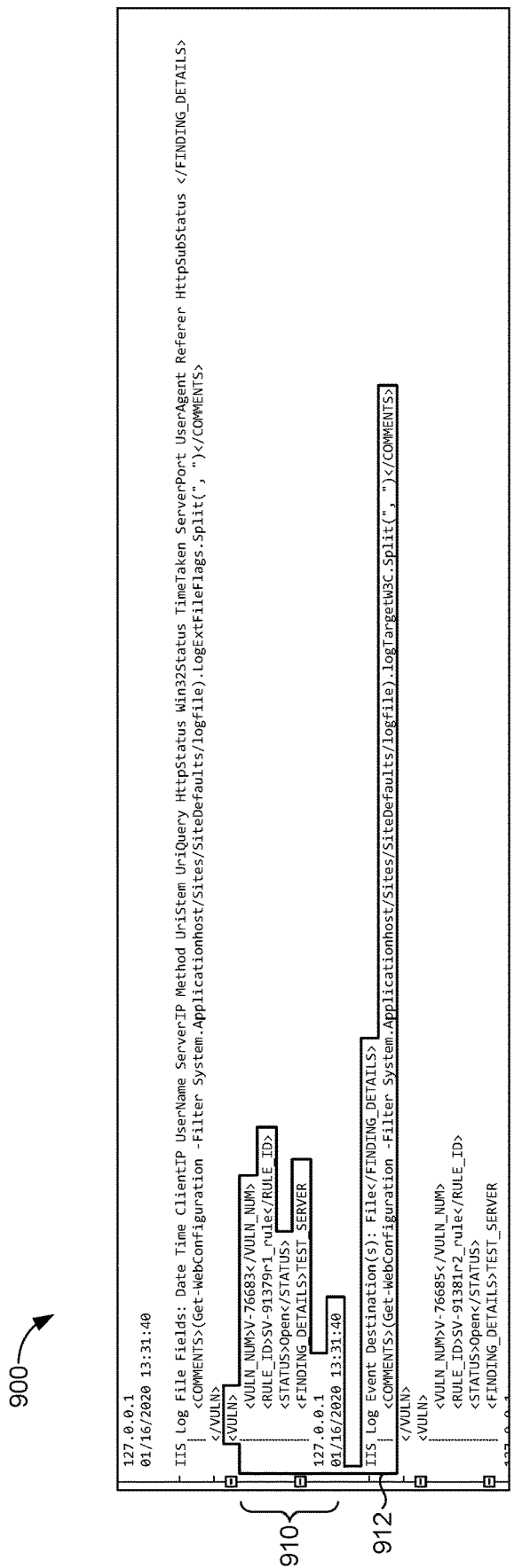

Once the security assessment is completed, an output file or report 900 shown in FIG. 9A is generated. The report 900 illustrated in FIG. 9A is an XML file, but it is contemplated that other file types may be used. As shown, the report 900 includes information 902 related to the security assessment conducted including the scan name, version, script name, start time, and end time. The report 900 also includes the name of the server and applications that were assessed at 903. Additionally, the report 900 includes the information related to the vulnerabilities assessed at 904. This information includes the assigned vulnerability ID, whether the determiner 237 has determined that the application is in compliance (passes the security check) with the security requirements outlined or is not in compliance (fails the security check) with the security requirements. Additionally, FIG. 9B illustrates additional portions of the report 900 generated including the script or code 912 used to conduct the assessment. As shown in FIG. 9A, the report generated includes the security assessment results for multiple vulnerabilities. This streamlines the reporting process and significantly decreases the evidence produced and transmitted to the government to verify security compliance. As such, a government individual who might have to review the report 900 would be able to review the outcome of multiple security assessments on multiple applications within one system in a more streamlined and less-cumbersome manner. Rather than viewing multiple files (e.g. screenshots and artifacts) to confirm that an application has met the security requirements, the results of the security assessment are produced in just a few lines of text within report 900. The exemplary report 900 generated has been approved and deemed acceptable by the government as evidence of conducting assessments to satisfy security requirements mandated in the STIGs.

Figure 10:
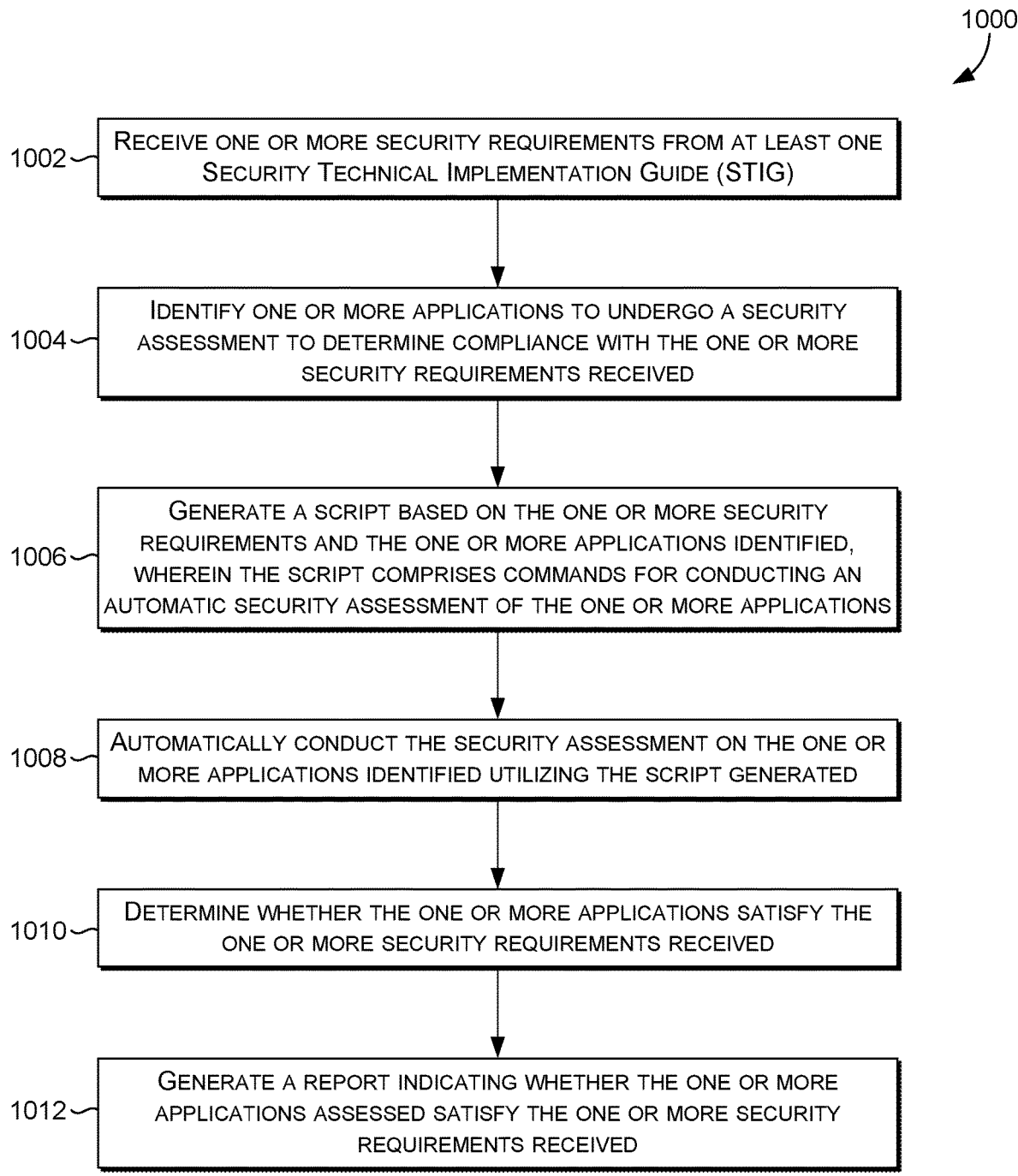
FIG. 10 illustrates a flow diagram showing an exemplary method for conducting an automated security assessment to determine compliance with security requirements received from STIGs.

Next, FIG. 10 illustrates a flow diagram showing an exemplary method 1000 for conducting automatic security assessments to determine security compliance for one or more applications. The method 1000 may be implemented by the computing system 200 described with respect to FIG. 2. At step 1002 the receiver 232 receives one or more security requirements from at least one Security Technical Implementation Guide (STIG). As discussed, the STIGs issued by DISA describe potential vulnerabilities within applications on servers and require security assessments on applications to establish compliance with the STIGs. Further, the receiver 232 may receive any number of security requirements from one or more STIGs. It is contemplated that in some aspects, it is possible for the receiver 232 to receive all available security requirements from all STIGs issued and then determine which security requirements apply to that specific server. Once the one or more security requirements have been received, the identifier 234 identifies one or more applications to undergo a security assessment to determine compliance with the one or more security requirements received at block 1004. As such, the identifier 234 will utilize the data received with the security requirements and identify the applicable applications to undergo security assessment.

Next, at block 1006, a script is generated for use in the automated security assessment to be conducted. The script is generated by the script creator 243 and is based on the one or more security requirements and the one or more applications identified, wherein the script comprises commands for conducting an automatic security assessment of the one or more applications. Utilizing the script generated, the security assessment is automatically conducted at block 1008 by the assessor 236. Conducting the security assessment includes scanning the one or more applications to determine whether potential vulnerabilities exist.

Once the assessor 236 has conducted the security assessment, the determiner 237 determines whether the one or more applications satisfy the one or more security requirements received at block 1010. The determination made will indicate whether the applications assessed are compliant or non-compliant with the security requirements outlined in the STIGs. In some instances, the determiner 237 may conclude that the one or more applications assessed are partially compliant or non-compliant and may further indicate which elements of each application are non-compliant.

Following the determiner 237's compliance determination, the generator 238 will generate a report at block 1012 that indicates the outcome of the security assessment conducted, including whether the one or more applications satisfy the one or more security requirements received. The type and format of the report generated will depend on a variety of factors including the host system and the STIG guidelines. Based on government approvals, the automated security assessment system described herein will allow for the generation of a single report encompassing the results of the security assessments conducted on multiple applications during the same audit. This will provide a more efficient and concise report for review by government officials and will decrease the need for submitting multiple files as evidence of compliance, which was historically done when manual assessments were conducted.

While not shown, the system 200 may further utilize the remediator 240 to resolve any findings of non-compliance. To do so, the remediator 240 may generate script or code to fix the error and remove the vulnerability detected that resulted in the non-compliant finding. Additionally, the system 200 may conduct additional assessments to confirm that the remediator 240 was successful in remediating the issues found and that the vulnerabilities have been eliminating, resulting in an updated finding of compliance with the security requirements received.

The present invention has been described in relation to particular embodiments, which are intended in all respects to be illustrative rather than restrictive. Further, the present invention is not limited to these embodiments, but variations and modifications may be made without departing from the scope of the present invention.

What is claimed is:

1. A system for conducting automatic security assessments to determine security compliance for one or more applications, the system comprising:
one or more processors configured to:
receive one or more security requirements from at least one Security Technical Implementation Guide (STIG);
automatically detect a plurality of applications present on a computing device;
automatically identify one or more applications in the plurality of applications to undergo a security assessment to determine compliance with the one or more security requirements received;

automatically generate a script based on the one or more security requirements and the one or more applications identified, wherein the script comprises commands for conducting an automatic security assessment of each of the one or more applications;

automatically conduct the security assessment on the one or more applications identified utilizing the script generated;

determine whether the one or more applications satisfy the one or more security requirements received; and generate a report indicating whether the one or more applications assessed satisfy the one or more security requirements received.

2. The system of claim 1, wherein the report generated comprises evidence that the one or more applications satisfied the one or more security requirements received.

3. The system of claim 1, wherein the report generated comprises evidence that one or more applications did not satisfy the one or more security requirements received.

4. The system of claim 3, wherein the system generates a resolution to remediate the one or more applications that do not satisfy the one or more security requirements.

5. The system of claim 4, wherein the system conducts at least one additional security assessment to determine whether the resolution resulted in the one or more applications satisfying the one or more security requirements.

6. The system of claim 1, wherein the at least one STIG comprises security requirements mandated by a Defense Information Security Agency (DISA).

7. The system of claim 1, wherein the system further conducts manual assessments of one or more additional applications.

8. The system of claim 1, wherein the report generated is an extensible markup language data file (XML) that is transmitted to the DISA for review.

9. The system of claim 1, further comprising identification of one or more vulnerabilities within the one or more applications identified, wherein each of the one or more vulnerabilities identified undergoes the security assessment.

10. The system of claim 9, wherein the one or more vulnerabilities identified within the one or more applications identified for the security assessment is assigned a vulnerability ID.

11. A method for conducting automatic security assessments to determine security compliance for one or more applications, the method comprising:

receiving one or more security requirements from at least one Security Technical Implementation Guide (STIG);

automatically detect a plurality of applications present on a computing device;

automatically identifying one or more applications in the plurality of applications to undergo a security assessment to determine compliance with the one or more security requirements received;

automatically generating a script based on the one or more security requirements and the one or more applications identified, wherein the script comprises commands for conducting an automatic security assessment of each of the one or more applications;

automatically conducting the security assessment on the one or more applications identified utilizing the script generated;

determining whether the one or more applications satisfy the one or more security requirements received; and generating a report indicating whether the one or more applications assessed satisfy the one or more security requirements received.

12. The method of claim 11, wherein the report is generated in a government approved file format.

13. The method of claim 11, further comprising storing the report generated in a database.

14. The method of claim 11, wherein the report generated includes one or more files that provide evidence that the one or more applications satisfied the one or more security requirements received.

15. The method of claim 11, wherein the report generated includes one or more files that provide evidence that the one or more applications is not compliant with the one or more security requirements received.

16. The method of claim 15, further comprising remediating one or more problems that resulted in non-compliance with the one or more security requirements received.

17. One or more non-transitory computer storage media having computer readable instructions for execution by one or more processors to perform a computerized method, the media comprising:

via one or more processors:

receiving one or more security requirements from a first source, wherein the one or more security requirements comprise configuration standards for one or more applications;

automatically detect a plurality of applications present on a computing device;

automatically identify one or more applications in the plurality of applications to be assessed for compliance with the one or more security requirements;

automatically generate a script based on the one or more security requirements and the one or more applications identified, wherein the script comprises commands for conducting an automatic security assessment of each of the one or more applications;

utilizing the script generated to automatically conduct a security assessment on the one or more applications identified;

determine whether the one or more applications are in compliance with the one or more security requirements; and generate a report indicating a compliance status of the one or more applications.

18. The media of claim 17, wherein when the compliance status of the one or more applications is a positive compliance status when the one or more security requirements have been satisfied.

19. The media of claim 17, wherein the compliance status of the one or more applications is a negative compliance status when the one or more security requirements have not been satisfied.

20. The media of claim 19, wherein the system further identifies one or more problems that resulted in the negative compliance status and generates one or more solutions to remediate the one or more problems identified.

* * * * *